US012706683B2

(12) United States Patent
Nilsson et al.

(10) Patent No.: US 12,706,683 B2
(45) Date of Patent: Aug. 11, 2026

(54) METHOD AND APPARATUS FOR ANTENNA CALIBRATION CONTROL

(71) Applicant: Telefonaktiebolaget LM Ericsson (publ), Stockholm (SE)

(72) Inventors: Magnus Nilsson, Lund (SE); Christian Braun, Vallentuna (SE); Hao Zhang, Guangdong (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 18/710,666

(22) PCT Filed: Nov. 17, 2021

(86) PCT No.: PCT/CN2021/131145
§ 371 (c)(1), (2) Date: May 16, 2024

(87) PCT Pub. No.: WO2023/087170
PCT Pub. Date: May 25, 2023

(65) Prior Publication Data

US 2025/0023647 A1 Jan. 16, 2025

(51) Int. Cl.
*H04B 17/12* (2015.01)
*H04B 17/14* (2015.01)
*H04W 56/00* (2009.01)

(52) U.S. Cl.
CPC .......... *H04B 17/12* (2015.01); *H04W 56/001* (2013.01); *H04B 17/14* (2015.01)

(58) Field of Classification Search
CPC ............................ H04B 17/12; H04W 56/001
See application file for complete search history.

(56) References Cited

U.S. PATENT DOCUMENTS 5,808,578 A 9/1998 Barbella et al.
6,480,153 B1 11/2002 Jung et al.
(Continued)

FOREIGN PATENT DOCUMENTS

CN 102324944 B 6/2014
CN 107493142 A 12/2017
(Continued)

OTHER PUBLICATIONS

Author Unknown, "5G; NR; Physical layer procedures for control," Technical Specification 138.213, Version 16.2.0, Jul. 2020, ETSI, 180 pages.
(Continued)

*Primary Examiner* — David Bilodeau
(74) *Attorney, Agent, or Firm* — Withrow & Terranova, PLLC

(57) ABSTRACT

A method is disclosed which is for controlling antenna calibration of an antenna system residing in a wireless communication network. The antenna calibration is for compensation of impairments associated with operation of the antenna system. The method comprises performing over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols. In some embodiments, the predetermined pattern comprises sequences of consecutive unused symbols. Each sequence of consecutive unused symbols which has a length exceeding a measurement length threshold may comprise one or more measurement opportunities, and each measurement may be performed during a respective measurement opportunity. According to some embodiments, the synchronization symbols are time aligned
(Continued)

for two or more network nodes operating within the network. Such embodiments may reduce interference during the measurements.

15 Claims, 5 Drawing Sheets

(56) References Cited

U.S. PATENT DOCUMENTS

| | | | | |
|---|---|---|---|---|
| 7,251,256 | B1 * | 7/2007 | Barry | H04L 7/08 370/503 |
| 10,470,095 | B2 | 11/2019 | Davis | |
| 10,826,727 | B1 * | 11/2020 | Zhou | H04L 25/022 |
| 10,993,242 | B1 | 4/2021 | Kim et al. | |
| 11,606,125 | B2 | 3/2023 | Aue | |
| 2001/0011961 | A1 | 8/2001 | Rexberg et al. | |
| 2003/0176166 | A1 | 9/2003 | Doi et al. | |
| 2004/0070533 | A1 | 4/2004 | Azuma | |
| 2006/0128436 | A1 | 6/2006 | Doi et al. | |
| 2007/0159407 | A1 | 7/2007 | Bolle et al. | |
| 2011/0195670 | A1 | 8/2011 | Dakshinamurthy et al. | |
| 2011/0250857 | A1 | 10/2011 | Reial et al. | |
| 2012/0020396 | A1 | 1/2012 | Hohne et al. | |
| 2015/0146584 | A1 | 5/2015 | Wang et al. | |
| 2015/0236779 | A1 | 8/2015 | Jalali | |
| 2017/0331670 | A1 | 11/2017 | Parkvall et al. | |
| 2018/0206141 | A1 | 7/2018 | Lupper et al. | |
| 2019/0141648 | A1 * | 5/2019 | Frankenberg | H04L 27/2655 |
| 2021/0116489 | A1 * | 4/2021 | Grieger | G01R 29/0892 |
| 2021/0208285 | A1 | 7/2021 | Ulmer et al. | |
| 2021/0250267 | A1 * | 8/2021 | Ioffe | H04W 56/0015 |
| 2022/0043104 | A1 * | 2/2022 | El Assaad | G01S 1/042 |
| 2022/0417874 | A1 * | 12/2022 | Kwak | H04W 72/0446 |

FOREIGN PATENT DOCUMENTS

| | | | |
|---|---|---|---|
| EP | 3623833 | A1 | 3/2020 |
| WO | 2020043310 | A1 | 3/2020 |
| WO | 2020048987 | A1 | 3/2020 |
| WO | 2020119910 | A1 | 6/2020 |
| WO | 2020244783 | A1 | 12/2020 |
| WO | 2021114263 | A1 | 6/2021 |
| WO | 2023072749 | A1 | 5/2023 |

OTHER PUBLICATIONS

Author Unknown, "Technical Specification Group Radio Access Network; NR; Base Station (BS) ElectroMagnetic Compatibility (EMC) (Release 16)," Technical Specification 38.113, Version 16.5.0, Sep. 2021, 3GPP Organizational Partners, 34 pages.

Author Unknown, "O-RAN Fronthaul Working Group: Control, User and Synchronization Plane Specification," Technical Specification O-RAN.WG4.CUS.0, Version 0.5.00, Jan. 2021, Alfter, Germany, O-RAN Alliance e.V., 292 pages.

Dahlman, et al., "5G NR: The Next Generation Wireless Access Technology," Chapter 9: Transport-Channel Processing, Aug. 2018, Academic Press, pp. 172-173.

Luo, et al., "How to Calibrate Massive MIMO," International Conference on Communications, Workshop on 5G & Beyond—Enabling Technologies and Applications, Jun. 8, 2015, London, United Kingdom, pp. 1119-1124.

International Search Report and Written Opinion for International Patent Application No. PCT/CN2021/131145, mailed May 11, 2022, 10 pages.

International Search Report and Written Opinion for International Patent Application No. PCT/EP2019/065029, mailed Feb. 25, 2020, 9 pages.

Non-Final Office Action for U.S. Appl. No. 17/617,038, mailed Jun. 5, 2023, 8 pages.

Notice of Allowance for U.S. Appl. No. 17/617,038, mailed Oct. 13, 2023, 8 pages.

Notice of Allowance for U.S. Appl. No. 17/617,038, mailed Feb. 14, 2024, 9 pages.

Notice of Allowance for U.S. Appl. No. 17/617,038, mailed Jul. 23, 2024, 8 pages.

* cited by examiner 200
201
202
203
204
205
206
210

PDCCH
UL/DL gap
PDSCH
PRACH
SSB
PUCCH
TRS
PUSCH
SR or PRACH&SR
PDSCH or PDCCH
Unused

SSB

Unused

FIG. 2B

METHOD AND APPARATUS FOR ANTENNA CALIBRATION CONTROL

This application is a 35 U.S.C. § 371 national phase filing of International Application No. PCT/CN2021/131145, filed Nov. 17, 2021, the disclosure of which is incorporated herein by reference in its entirety.

TECHNICAL FIELD

The present disclosure relates generally to the field of wireless communication. More particularly, it relates to calibration of antenna systems for wireless communication.

BACKGROUND

Antenna systems with a plurality of antenna elements, such as advanced—or active—antenna systems (AAS), may be used to enhance performance of wireless communication, e.g., by enabling beamforming and/or multiple-input multiple-output (MIMO) operation.

Typically, there is a need to accurately control the phase and/or gain of the antenna elements when antenna systems are used; the control of an antenna element being for absolute phase/gain values, and/or for phase/gain relative to one or more other antenna elements.

A problem in this regard is that impairments associated with operation of the antenna system can make the control of phase and/or gain inaccurate and/or unpredictable. Impairments associated with operation of the antenna system may, for example, present themselves as variations over time and/or as variations between different circuitry parts that are intended to have identical properties.

The impairments associated with operation of the antenna system may, for example, include hardware impairments of radio circuitry connected to the antenna elements, e.g., power amplifiers (PA), low noise amplifiers (LNA), mixers, digital-to-analog converters (DAC), analog-to-digital converters (ADC), etc. Hardware impairments may, for example, be due to inaccuracy during hardware production and/or due to environmental variations (e.g., temperature variations and variations in supply voltage) during operation of the hardware.

In a typical example, each antenna element is associated with a respective transceiver chain, and the different transceiver chains have different characteristics due to hardware impairments.

Thus, there is a need to detect and compensate for impairments associated with operation of the antenna system; a process that is commonly referred to as antenna calibration. Preferably, the antenna calibration should be possible to conduct repeatedly and during operation of the wireless communication system in which the antenna system is deployed, e.g., to enable dynamic adaptation to variations over time.

There exist various approaches to antenna calibration. For example, WO 2020/043310 A1 and WO 2021/114263 A1 describe methods for antenna calibration. Some antenna calibration approaches utilize over-the-air signaling, wherein at least one antenna element of the antenna system configured for transmission and measurements are performed with at least one other antenna element of the antenna system configured for reception.

A problem in the context of antenna calibration with over-the-air signaling is that the antenna system cannot be used for other transmission or reception while the measurements are performed. Another problem is that the measurements may experience interference from other transmissions in the wireless communication system in which the antenna system is deployed. Another problem is that emission restrictions may be imposed on the over-the-air signaling, to avoid that it causes interference to other devices.

Therefore, there is a need for approaches to antenna calibration control. For example, there is a need for antenna calibration control that addresses one or more of the above-identified problems regarding over-the-air signal measurements.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for controlling antenna calibration of an antenna system residing in a wireless communication network. The antenna calibration is for compensation of impairments associated with operation of the antenna system.

The method comprises performing over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols.

In some embodiments, the unused symbols are symbols other than symbols dedicated to any of: uplink signaling, downlink signaling, random access, synchronization signaling, scheduling request signaling, scheduling grant signaling, reference signaling, and gap for switching between downlink and uplink signaling.

In some embodiments, used symbols are one or more of: uplink signaling, downlink signaling, random access, synchronization signaling, scheduling request signaling, scheduling grant signaling, reference signaling, and gap for switching between downlink and uplink signaling.

In some embodiments, the predetermined pattern comprises sequences of consecutive unused symbols, wherein each sequence of consecutive unused symbols which has a length exceeding a measurement length threshold comprises one or more measurement opportunities, and wherein each measurement is performed during a respective measurement opportunity.

In some embodiments, the unused symbols are symbols that are unassigned and/or undedicated and/or unallocated.

In some embodiments, the synchronization symbols are time aligned for two or more network nodes operating within the network.

In some embodiments, the unused symbols of the predetermined pattern of unused symbols are symbols of slots that comprise one or more synchronization signal blocks (SSB), and/or symbols of time units that comprise one or more collection of synchronization symbols, wherein a collection of synchronization symbols has at least one purpose which coincides with a purpose of a SSB.

In some embodiments, each SSB consists of four symbols, and/or each of the slots comprises up to two SSBs, and/or each of the slots consists of fourteen symbols, and/or the predetermined pattern is configured to comprise between twelve and sixty-four SSBs, and/or each of the slots comprises three, four, five, or six unused symbols.

In some embodiments, the method further comprises, for each of the measurements, prior to performing the measurement and during an unused symbol, switching one or more antenna elements from transmission mode to reception mode or from reception mode to transmission mode.

In some embodiments, the method further comprises, for each of the measurements, after performing the measurement and during an unused symbol, switching one or more antenna elements from reception mode to transmission mode or from transmission mode to reception mode.

In some embodiments, the measurements are performed using over-the-air signaling with at least one antenna element of the antenna system configured for transmission and at least one other antenna element of the antenna system configured for reception.

In some embodiments, the measurements comprise a predetermined set of measurements, wherein different measurements of the set are for different configuration patterns of the antenna elements of the antenna system.

In some embodiments, performing the measurements comprises repeatedly performing the set of measurements.

In some embodiments, performing the measurements comprises performing the set of measurements responsive to one or more of: elapse of a predetermined time since performance of a previous set of measurements, detection of a temperature change in relation to the antenna system, and detection of deteriorating communication performance in relation to the antenna system.

In some embodiments, the method further comprises, for at least one of the measurements, determining whether the performed measurement is unreliable, and—when the performed measurement is unreliable—discarding a result of the performed measurement and repeating the measurement.

In some embodiments, the method is performed by a network node associated with the antenna system.

In some embodiments, the method further comprises acquiring information indicative of the predetermined pattern of unused symbols.

In some embodiments, the antenna system is an active antenna system (AAS).

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling antenna calibration of an antenna system residing in a wireless communication network. The antenna calibration is for compensation of impairments associated with operation of the antenna system.

The apparatus comprises controlling circuitry configured to cause performance of over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols.

A fourth aspect is a network node comprising the apparatus of the third aspect.

In some embodiments, the network node further comprises the antenna system.

In some embodiments, any of the above aspects may additionally have features identical with or corresponding to any of the various features as explained above for any of the other aspects.

An advantage of some embodiments is that alternative approaches to antenna calibration control are provided.

An advantage of some embodiments is that over-the-air signal measurements are performed without causing overhead to other signaling, i.e., without using communication resources (e.g., symbols) that would otherwise be available for the other signaling.

An advantage of some embodiments is that over-the-air signal measurements are performed without interruption of other signaling.

An advantage of some embodiments is that no interaction with higher layer functions is necessary to position over-the-air signal measurements in the time dimension (e.g., interaction for scheduling the measurements by interrupting communication traffic, and/or interaction to localize symbols scheduled for communication traffic but not used therefor).

An advantage of some embodiments is that over-the-air signal measurements can be conducted autonomously by a radio unit (RU), such as an open radio access network (O-RAN) RU.

An advantage of some embodiments is that interference experienced for over-the-air signal measurements may be reduced compared to other approaches.

An advantage of some embodiments is that emission restrictions imposed on the over-the-air signaling may be avoided or at least reduced compared to other approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 2A is a schematic drawing illustrating an example predetermined pattern of unused symbols according to some embodiments;

FIG. 2B is a schematic drawing illustrating an example predetermined pattern of unused symbols according to some embodiments;

DETAILED DESCRIPTION

Figure 1:
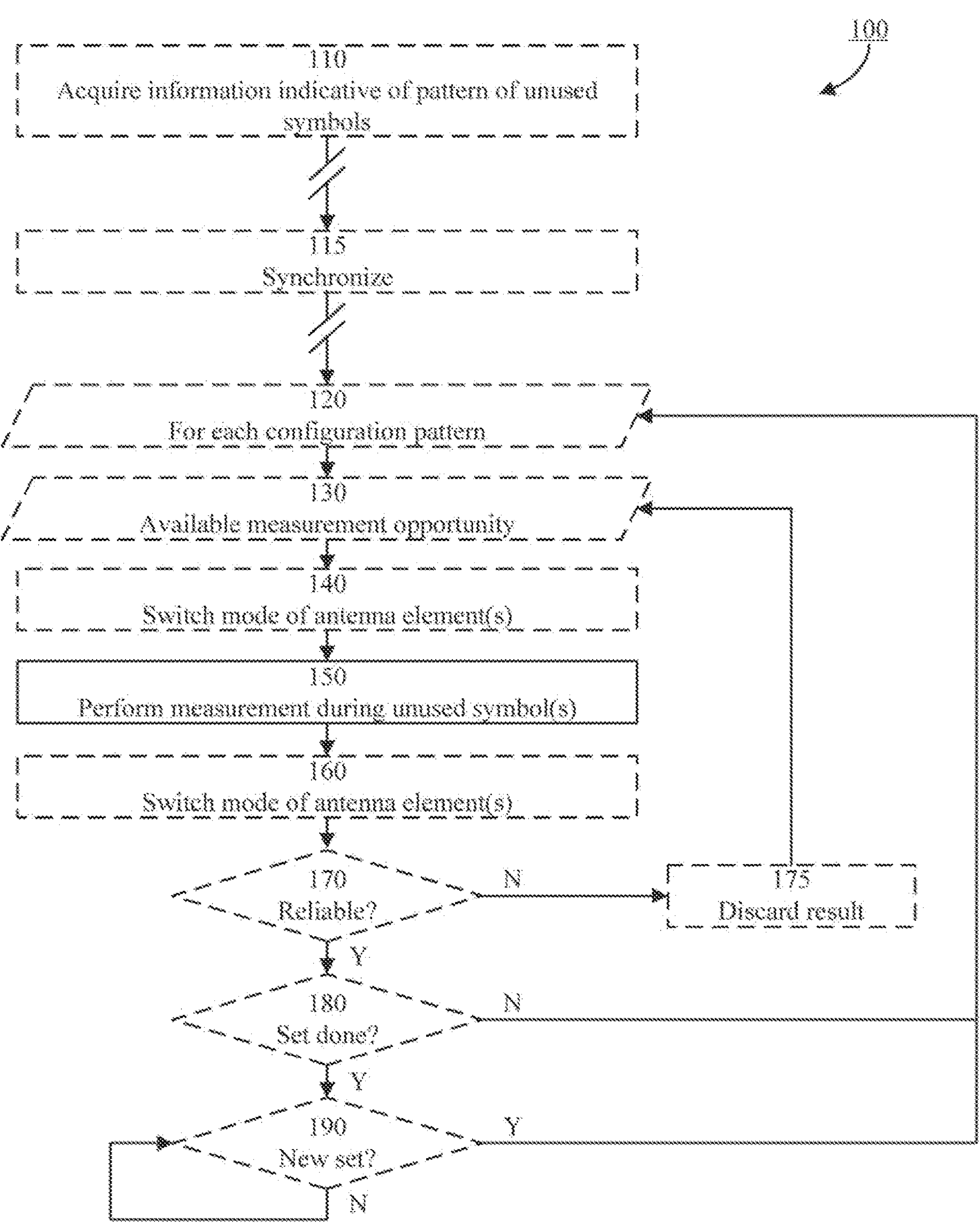
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described wherein over-the-air signal measurements for antenna calibration are performed during symbols that are predefined as unused. At least some of the unused symbols are directly preceding synchronization symbols and/or directly following synchronization symbols.

The predefinition is according to a predetermined pattern. The device (e.g., a network node) that controls the measurements typically has knowledge of the predetermined pattern of unused symbols. Hence, there is typically no specific signaling required (with other devices, with higher layers, or otherwise) to determine when to carry out over-the-air signal measurements.

Some embodiments may be particularly useful in the context of Third Generation Partnership Program (3GPP) standardized communication; e.g., fifth generation (5G) communication-such as new radio (NR) communication—or sixth generation (6G) communication. Further, some embodiments may be particularly beneficial for relatively high frequencies (e.g., for millimeter wavelength, mmW, communication; frequencies above 1 GHz) such as, for example, frequency range 2 (FR2) that comprises one or more frequency bands within a frequency interval from 24.25 GHz to 52.6 GHZ, frequency range 3 (FR3), or other suitable frequency ranges. It should be noted, however, that embodiments may be equally applicable to other contexts.

Each generation of wireless communication systems (e.g., cellular systems) typically aims to improve the capacity and spectral efficiency of the radio access aspect of the system. In 5G, this aim is approached by use of additional frequency bands and by application of beamforming. FR2 is added in 5G, which gives a lot of additional available spectrum in the range 24.25-52.6 GHz. In this frequency range, beamforming is utilized to improve coverage and capacity. Since the wavelengths are small for this frequency range, it is feasible to employ antenna arrays with hundreds, or even thousands, of antenna elements. This trend is expected to continue for 6G; with exploitation of even further frequency bands and application of more advanced beamforming.

Beamforming is enabled by transmitting and/or receiving signals with specifically controlled relative phases and gains for the antenna elements. Thus, accurate beamforming typically requires precise control of the relative phases and gains for the antenna elements. When AAS radios are implemented, there are a lot of potential impairments that might contribute to uncertainty regarding the relative phases and gains. Example impairments include impairments caused by production variations, impairments caused by variations in supply voltage, and impairments caused by thermal variation. Antenna calibration may be beneficial to enable mitigation of such impairments (e.g., by detecting the impairments and providing compensation for them). It may be desirable that the antenna calibration is possible to run during operation of the AAS radio device, to enable a dynamic impairment mitigation.

A potential problem of running antenna calibration includes disruption of ongoing transmission or reception (i.e., loss in traffic capacity). Even efficient antenna calibration approaches such as over-the-air measurements exploiting mutual coupling between antenna elements may cause such loss in traffic capacity.

In some applications, symbols scheduled for communication traffic but not used therefor may be utilized for antenna calibration measurements. An alternative or additional potential problem of running antenna calibration in this manner is that a procedure is needed to localize such symbols dynamically. This typically involves interaction with higher layer functions, which has the same problems as described in the following.

A further alternative or additional potential problem of running antenna calibration includes that information exchange between the physical layer and higher layers (e.g., in a base station comprising the antenna system) might be required. For example, information that antenna calibration measurements are needed may be provided to the higher layers, which may schedule time slots for the antenna calibration and provide information regarding such scheduled slots to the physical layer.

This is particularly cumbersome in relation to open radio access network (O-RAN) applications with LLS (lower layer split). In O-RAN, typical base station functionality may be split between an open radio unit (O-RU) and a corresponding open distributed unit (O-DU). The O-DU may, for example, comprise one or more of the following functions (for transmission mode): scrambling, modulation, layer mapping, precoding, resource element mapping, and inphase/quadrature compression. The O-RU may, for example, comprise one or more of the following functions (for transmission mode): inphase/quadrature decompression, precoding, digital beamforming, inverse fast Fourier transform, cyclic prefix addition, digital-to-analog conversion, and analog beamforming. The O-DU and the O-RU have an openly standardized interface—O-RAN fronthaul (O-RAN FH)—between them, over which information exchange between the physical layer and higher layers occurs. The O-RAN setup may lead to interoperability issues in relation to information exchange between the physical layer and higher layers. For example, the O-DU and the O-RU might originate from different vendors, and information exchange between the physical layer and higher layers-which typically requires specific O-RAN management plane (M-plane) signaling-might be interpreted and implemented differently depending on the different vendors.

Yet an alternative or additional potential problem of running antenna calibration relates to that over-the-air measurements typically use a shared air interface which is susceptible to interference. For example, when the antenna calibration measurements for a base station are run in uplink (UL) slots and interrupt communication reception, the calibration signaling typically has to comply with stringent power requirements normally applied during reception (power off requirements) to not cause more interference than allowed. Furthermore, when the antenna calibration measurements are run in uplink (UL) slots and interrupt communication reception, the calibration signaling reception may be interfered with by user equipment (UE) transmissions. Similarly, when the antenna calibration measurements are run in downlink (DL) slots and interrupt communication transmission, the calibration signaling reception may be interfered with by transmissions from other base stations.

One or more of these problems may be solved by application of some embodiments. For example, some embodiments suggest using unused symbols surrounding synchronization signals, such as synchronization signal block (SSB) transmissions, for antenna calibration measurements.

Even though SSB is used herein as an illustrative example of synchronization symbols, it should be noted that embodiments may be equally applicable to other scenarios. For example, the unused symbols may be symbols of time units (wherein slots are an example) that comprise one or more collection of synchronization symbols (wherein SSBs are an example), wherein a collection of synchronization symbols has at least one purpose which coincides with a purpose of a SSB. Hence, embodiments are not limited to the naming convention wherein a time unit is termed "slot" and a collection of synchronization symbols is termed "SSB". Specifically, embodiments are applicable to 5G as well as 6G, even if new terminology is introduced.

Since otherwise unused symbols are utilized for the antenna calibration measurements, there is no—or a reduced—need to schedule other symbols for the antenna calibration measurements. Thereby, no—or at least less—loss of traffic capacity is experienced compared to other approaches.

Since the unused symbols are known beforehand, no information exchange between the physical layer and higher layers is needed. Hence, the antenna calibration can be handled locally in a RU (e.g., O-RU). Furthermore, no procedure is needed to localize symbols scheduled for communication traffic but not used therefor.

Since the synchronization signals are typically transmitted in DL slots, any emission restrictions are related to the power requirements normally applied during transmission—which are much more relaxed than the stringent power requirements normally applied during reception If the synchronization signal transmissions in a geographical region are synchronized between base stations, there is no interference from other (synchronized) base stations. There may still be interference from un-synchronized base stations (e.g., adjacent channel interference from base stations of other operators), but the interference is at least reduced compared to other applications.

FIG. 1 illustrates an example method 100 according to some embodiments. The method 100 is for controlling antenna calibration of an antenna system that resides in a wireless communication network. The antenna system may be an active/advanced antenna system (AAS).

The method 100 may be performed by a network node associated with (e.g., comprising and/or controlling) the antenna system. Example network nodes include a radio access node, a base station (BS), an access point (AP), a radio unit (RU), and an open radio access network (O-RAN) radio unit (O-RU).

The antenna calibration is for compensation of impairments associated with operation of the antenna system (e.g., hardware impairments of radio circuitry connected to antenna elements of the antenna system, as described above). For example, the impairments may be causing performance deterioration in relation to beamforming and/or MIMO operation, and the antenna calibration may aim to mitigate such performance deterioration.

Example impairments include impairments caused by production variations (e.g., inaccuracy during hardware production), and impairments caused by environmental variations (e.g., temperature variations and variations in supply voltage) during operation of the hardware.

Typically, antenna calibration is for compensating impairments of (e.g., between) the transceiver chains (e.g., the radio portions of the transceiver chains) that support the antenna system. For example, each antenna element may be associated with a respective transceiver chain, and the different transceiver chains may have different characteristics due to hardware impairments, which differences the antenna calibration may aim to mitigate.

The impairments associated with operation of the antenna system may, for example, include hardware impairments of radio circuitry connected to the antenna elements, e.g., power amplifiers (PA), low noise amplifiers (LNA), mixers, digital-to-analog converters (DAC), analog-to-digital converters (ADC), etc.

As illustrated by step 150, the method 100 comprises performing over-the-air measurements of the antenna calibration during unused symbols defined by a predetermined pattern of unused symbols. The predetermined pattern is, typically, a pattern in the time dimension.

The unused symbols are predetermined as unused; i.e., the unused symbols are not predetermined (e.g., scheduled or dedicated) for any specific use.

Generally, an unused symbol may be defined as a symbol during which no signaling is planned to take place between devices of the network (e.g., a quiet time). Typically, an unused symbol is unused over the entire frequency range for which the symbols is defined.

For example, according to some embodiments, the unused symbols are symbols other than symbols dedicated to any of: uplink signaling, downlink signaling, random access, synchronization signaling, scheduling request signaling, scheduling grant signaling, reference signaling, and gap for switching between downlink and uplink signaling.

Alternatively or additionally, used symbols (as opposed to unused symbols) are one or more of: uplink signaling, downlink signaling, random access, synchronization signaling, scheduling request signaling, scheduling grant signaling, reference signaling, and gap for switching between downlink and uplink signaling.

Yet alternatively or additionally, the unused symbol may be defined as one or more of: unassigned symbols, undedicated symbols, and unallocated symbols.

Thereby, the problem that the antenna system cannot be used for other transmission or reception while the measurements are performed is addressed, since the measurements are performed in symbols that are not otherwise needed for transmission or reception.

No interruption of other utilizations of the antenna system is needed. For example, it is not necessary to interrupt uplink or downlink communication (thereby impairing throughput, and/or introducing overhead signaling with higher layers and/or other devices) to perform antenna calibration measurements.

Furthermore, since the unused symbols are defined by a predetermined pattern, there is no need for any procedure (e.g., signaling with higher layers) to localize symbols that are not used for other purposes (e.g., symbols that are scheduled for uplink and or downlink communication but that remain unutilized for such communication) and use them for antenna calibration measurements.

The predetermined pattern of unused symbols comprises unused symbols directly preceding synchronization symbols and/or unused symbols directly following (e.g., directly subsequent to) synchronization symbols.

In some embodiments, the unused symbols of the predetermined pattern may be symbols of slots that comprise one or more synchronization signal blocks (SSB). An example where these embodiments are applicable is when the predetermined pattern is defined for FR2 (frequency bands within a frequency interval from 24.25 GHz to 52.6 GHZ).

Each SSB may consist of four symbols. Each slot may consist of fourteen symbols and may comprise up to two SSBs (i.e., zero, one, or two SSBs). Each slot may comprise three, four, five, or six unused symbols in some embodiments (e.g., when a slot consists of fourteen symbols and comprises two SSBs of four symbols each). In some examples, a slot of fourteen symbols comprises two consecutive SSBs of four symbols each, which may be positioned in three different locations-starting at the third, fourth, or fifth symbol of the slot (e.g., when the two first and the two last symbols of the slot should be left available for other use).

The predetermined pattern may be configured to comprise between twelve and sixty-four SSBs, for example. The predetermined pattern may be repeatedly applied in the time dimension. According to some embodiments, the predetermined pattern extends over 20 ms (or longer), and is thereafter repeated.

Typically, each measurement is performed using one or more unused symbols, e.g., using a sequence of two or more (e.g., three or more) consecutive unused symbols.

For example, the predetermined pattern may comprise sequences of consecutive unused symbols. Each sequence of consecutive unused symbols which has a length exceeding a measurement length threshold may be seen as comprising one or more measurement opportunities. For example, each sequence of consecutive unused symbols which has a length equal to a measurement length may be seen as constituting a measurement opportunity.

Each antenna calibration measurement may be performed during a respective one of such measurement opportunities, as illustrated by 130 in FIG. 1. Overlapping measurement opportunities can typically not be used for more than one measurement.

Typically, an antenna calibration measurement is performed using over-the-air signaling with at least one antenna element of the antenna system configured for transmission and at least one other antenna element of the antenna system configured for reception. Antenna configuration patterns describing which antenna elements should be configured for transmission and reception, respectively, can be any suitable patterns (e.g., according to the prior art), and may—or may not—utilize antenna couplings between different antenna elements.

To this end, the method 100 may further comprise, switching one or more antenna elements from transmission mode to reception mode or from reception mode to transmission mode prior to performing each measurement of step 150; as illustrated by optional step 140. Alternatively or additionally, the method 100 may further comprise, switching one or more antenna elements from reception mode to transmission mode or from transmission mode to reception mode after performing each measurement of step 150; as illustrated by optional step 160.

Which antenna element(s) are switched in steps 140 and 160, and between which modes, is determined by the applicable pattern describing which antenna elements should be configured for transmission and reception during the measurement, as well as by the use defined for symbols preceding the switching of step 140 and for symbols following the switching of step 160.

Each of steps 140 and 160 may perform its respective switching during an unused symbol. Typically, step 140 is performed directly prior to step 150 and step 160 is performed directly after step 150. Thus, two additional unused symbols may be needed for switching, which are consecutive with the unused symbol(s) during which the measurement is performed.

For example, if two unused symbols are needed to perform a measurement in step 150, a sequence of four consecutive unused symbols may be required for steps 140-160. In such an example, a sequence of four consecutive unused symbols in the predetermined pattern may be defined as a measurement opportunity, the measurement length threshold may be set to four symbols, and the measurement length may be defined as four symbols.

This example can be generalized such that, if x unused symbols are needed to perform a measurement in step 150 and y symbols are required for each of steps 140 and 160, a sequence of x+2y (or more) consecutive unused symbols in the predetermined pattern may be defined as a measurement opportunity, the measurement length threshold may be set to x+2y symbols (or higher), and the measurement length may be defined as x+2y symbols; x and/or y being positive integers or positive non-integers (e.g., y being less than one).

In some embodiments, the method 100 further comprises determining whether a performed measurement is reliable or unreliable, as illustrated by optional step 170. The determination of step 170 may be based on a signal quality metric obtained for the performed measurement (e.g., a signal-to-interference ratio—SIR, or similar). For example, if the signal quality metric falls on a first side of a quality metric threshold (e.g., SIR above a SIR threshold) the performed measurement may be determined as reliable, and if the signal quality metric falls on a second side of the quality metric threshold (e.g., SIR below the SIR threshold) the performed measurement may be determined as unreliable.

If the performed measurement is determined to be reliable (Y-path out of step 170), the result of the performed measurement may be used for antenna calibration. If the performed measurement is determined to be unreliable (N-path out of step 170), the method 100 may comprise discarding the result of the performed measurement as illustrated by optional step 175, and repeating the measurement as illustrated by the return to step 130.

Repeating a measurement may comprise performing step 150 again with the same antenna element configuration but in a different measurement opportunity.

Step 170 may be performed for all performed measurements or for only some performed measurements. For example, step 170 may be omitted for repeated measurements.

As already mentioned, an antenna calibration measurement may be performed using over-the-air signaling with at least one antenna element of the antenna system configured for transmission and at least one other antenna element of the antenna system configured for reception according to some antenna configuration pattern. Typically, an antenna configuration event comprises a sequence of measurements using different antenna configuration patterns. Such a sequence of measurements using different antenna configuration patterns may be termed as a predetermined set of measurements.

Thus, the measurements of method 100 may comprise a predetermined set of measurements (e.g., each measurement being performed in a respective measurement opportunity), wherein different measurements of the set are for different configuration patterns of the antenna elements of the antenna system. The looping through each antenna configuration pattern of a set is illustrated in FIG. 1 by optional steps 120 and 180.

While there are configuration patterns of the set that have not been measured for the ongoing antenna calibration event (N-path out of step 180), the method returns to 120 for measurements using a next configuration pattern. If a measurement is to be repeated as elaborated on above, the repetition may be performed within the set of measurements; either directly after the unreliable measurement, or later within the set.

When all configuration patterns of the set have been measured for the ongoing antenna calibration event (Y-path out of step 180), the method proceeds to optional step 190.

Step 190 illustrates that the measurements of method 100 may comprise repeatedly performing the set of measurements (e.g., for each antenna calibration event). When the set of measurements is to be repeated (Y-path out of step 190), the method returns to 120 for measurements using a first configuration pattern of the set. While there is no repetition of the set of measurements (N-path out of step 190), the method lingers in step 190.

Antenna calibration is preferably conducted repetitively, to enable dynamic adaption to changing conditions. This may be achieved through repeated antenna calibration events, illustrated by the repeatedly performed set of measurements in FIG. 1. Timing of the antenna calibration events may be periodic and/or based on some triggering conditions.

For example, an antenna calibration event (and, thus, performance of the set of measurements) may be responsive to elapse of a predetermined time since performance of a previous set of measurements (periodic), and/or detection of a temperature change in relation to the antenna system (example trigger event), and/or detection of deteriorating communication performance (e.g., decreasing SIR, decreasing throughput, decreasing signal strength, etc.) in relation to the antenna system (example trigger event). In some embodiments, step 190 may comprise detecting a trigger event as exemplified above.

Once measurements are performed for an antenna calibration event, the rest of the antenna calibration is performed using any suitable approach (e.g., as known from the prior art). For example, WO 2020/043310 A1 describes a method for antenna calibration that may be applicable in relation to embodiments presented herein. Some suitable antenna calibration methods utilize antenna coupling combined with roundtrip measurements to derive the relative phase and gain relation in between antennas.

As mentioned above, the device (e.g., a network node) that controls the measurements according to method 100 typically has knowledge of the predetermined pattern of unused symbols. This knowledge is typically somehow acquired at least once (e.g., received in a control message from a network controller node, input through an interface by an installation operator, provided in association with production, etc.), which is illustrated in FIG. 1 by optional step 110 where information indicative of the predetermined pattern of unused symbols is acquired.

In some embodiments, there may be a possibility to update the knowledge when needed (e.g., when a predetermined pattern is changed, cancelled, or added). It should be noted that such updating is relatively rarely (or seldom) performed compared to the antenna calibration and its associated measurements.

If the unused symbols are within a time period otherwise dedicated to transmission, the emission restrictions imposed on the over-the-air signaling may be equal to emission restrictions for transmission (or even more relaxed). For example, for a network node performing the method 100, when the unused symbols are symbols of slots that comprise SSB, the slot is typically a downlink slot and there may be no (or very relaxed) emission restrictions.

In some embodiments, the synchronization symbols are time aligned (i.e., synchronized) for two or more (e.g., all) network nodes operating within the wireless communication network, as illustrated by optional step 115. This may typically entail that the unused symbols are—at least to some extent—also time aligned. This means that interference caused by transmissions by other network nodes during over-the-air signal measurements may be reduced compared to if the unused symbols were not synchronized.

In short, some embodiments propose that antenna calibration measurements are performed during unused (i.e., empty) symbols that surround synchronization symbols (e.g., SSB).

This principle is illustrated in the following for FR2 as used in 5G (see, e.g., the 3GPP technical specification (TS) 38.113), wherein SSB is sent using narrow beams to overcome the increased path loss experienced for higher frequencies. In this example context, 12-64 SSBs can be configured (corresponding to the number of SSBs that are used to define a pattern of unused symbols), each SSB consists of four symbols, and the configured SSBs are typically sent every 20 ms (corresponding to the length of a pattern of unused symbols). The first two symbols and the last two symbols of a slot are reserved for potential UL or DL control signaling; i.e., a slot can comprise at most two SSBs (fourteen symbols minus first and last two symbols leaves ten symbols, which can accommodate at most two SSBs of four symbols each).

Figure 2A:
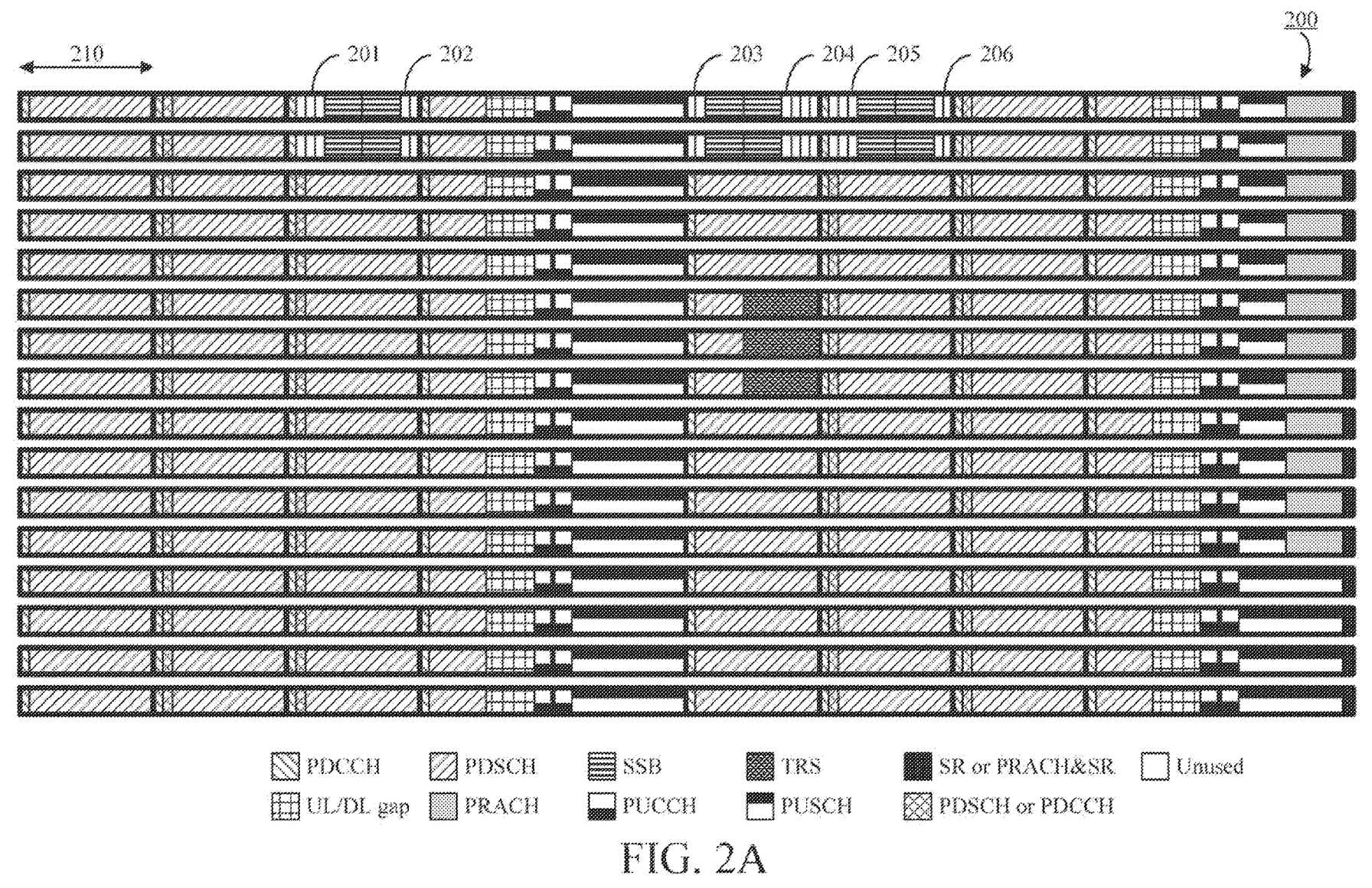

FIG. 2A schematically illustrates an example predetermined pattern 200 of unused symbols according to some embodiments (e.g., for FR2 as used in 5G).

Figure 2B:
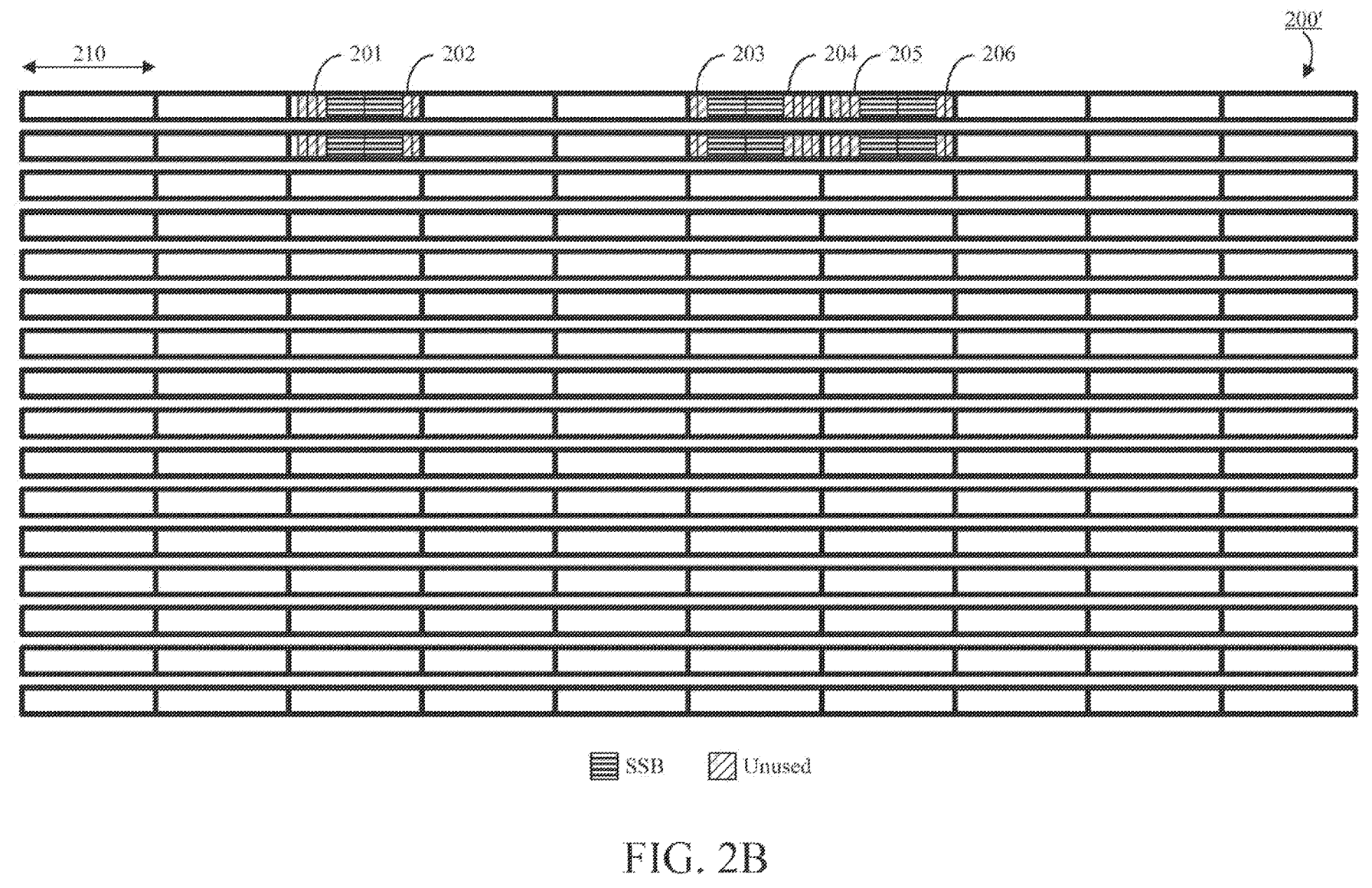

FIG. 2B also schematically illustrates an example predetermined pattern 200' of unused symbols according to some embodiments. For example, the pattern 200' of FIG. 2B may be seen as a simplified illustration of the pattern 200 of FIG. 2A. For simplicity, the following description will refer to the pattern 200 of FIG. 2A. It should be noted, however, that any reference to the pattern 200 of FIG. 2A is equally applicable for the pattern 200' of FIG. 2B.

The pattern 200 is suitable for FR2 and is inspired by the 3GPP specification defining allowed SSB positions, technical specification (TS) 38.113 (see, e.g., chapter 4.1, case D). The pattern 200 of FIG. 2A may be seen as a typical example of a time division duplex (TDD) pattern using 12 SSBs.

The pattern 200 is a 20 ms long pattern consisting of 160 slots (denoted slot 0 (210), slot 1, slot 2, . . . , slot 159; each row showing time elapse from left to right, and the rightmost slot of one row followed by the leftmost slot of the row directly below) consisting of fourteen symbols each.

Most symbols of the pattern 200 are predetermined (e.g., scheduled or dedicated) for a specific use as illustrated by the different symbol fillings in FIG. 2A. However, it is noted that the slots that comprise SSB (namely slot 2, slot 5, slot 6, slot 12, slot 15, and slot 16) also comprises some unused symbols; e.g., slot 2 comprises a sequence of three consecutive unused symbols 201 and a sequence of two consecutive unused symbols 202, slot 5 comprises a sequence of two consecutive unused symbols 203 and a sequence of four consecutive unused symbols 204, and slot 6 comprises a sequence of three consecutive unused symbols 205 and a sequence of two consecutive unused symbols 206. According to some embodiments, these unused symbols may be used to perform measurements for antenna calibration.

Referring to the example for FR2 as used in 5G, wherein 12-64 SSBs can be configured, it may be noted that FIG. 1 illustrates an example with the minimum number (12) of SSBs configured; leaving a minimum number (32) of unused symbols available for antenna calibration measurements.

When an antenna calibration measurement is to be performed, each antenna element typically needs to be set to either reception (RX) or transmission (TX) mode first (e.g., according to the applicable antenna element configuration pattern). Correspondingly, after the measurement has been performed, each antenna element typically needs to be set to either transmission (TX) or reception (RX) mode in relation to whether the subsequent symbols are dedicated to transmission or reception. In a typical example, setting of the antenna elements to proper TX/RX modes may require one symbol before a measurement and one symbol after a measurement. For example, when the sub-carrier spacing (SCS) is 120 kHz, one symbol duration is approximately 9 μs, which may suffice for TX/RX mode switching according to some scenarios.

If it is assumed that the measurement requires one symbol, a total of three symbols are needed for antenna calibration measurement according to this example. Referring to FIG. 2A, it can be noted that, within the pattern of unused symbols 200, there are six possible sequences of consecutive unused symbols that may accommodate this need (a sequence of three symbols in slot 2, a sequence of four symbols in slot 5—two different positions possible for the measurement opportunity, a sequence of three symbols in slot 6, a sequence of three symbols in slot 12, a sequence of four symbols in slot 15—two different positions possible for the measurement opportunity, and a sequence of three symbols in slot 16).

If it is assumed that the measurement requires two symbols, a total of four symbols are needed for antenna calibration measurement according to this example. Referring to FIG. 2A, it can be noted that, within the pattern of unused symbols 200, there are two possible sequences of consecutive unused symbols that may accommodate this need (a sequence of four symbols in slot 5, and a sequence of four symbols in slot 15).

If it is assumed that a total of only two symbols are needed for antenna calibration measurement (e.g., time corresponding to one symbol for the measurement, and time corresponding to half a symbol for setting of the antenna elements to proper TX/RX before and after a measurement), it can be noted that, within the pattern of unused symbols 200, there are twelve possible sequences of consecutive unused symbols that may accommodate this need.

The desired interval between antenna calibrations (i.e., the interval between each set of measurements as elaborated on in connection with FIG. 1) may be implementation specific. A typical example may be in the order of 1 second to 1 minute. Assuming that a total of four symbols are needed for each antenna calibration measurement (which may be seen as a pessimistic scenario; relatively many unused symbols needed), the example pattern of FIG. 2A (which may also be seen as a pessimistic scenario; relatively few unused symbols available) provides for 100 possible sequences of consecutive unused symbols that may accommodate an antenna calibration measurement.

Thus, when the interval between antenna calibrations is 1 second, a set of measurements can comprise up to 100 different configuration patterns for the antenna elements, when the interval between antenna calibrations is 1 minute, a set of measurements can comprise up to 6000 different configuration patterns for the antenna elements. In theory, it might be possible to catch all relevant antenna element coupling paths by just three measurements using different antenna element configuration patterns (see, e.g., WO 2020/043310 A1). In practice, however, a few more antenna configuration patterns (and thereby a few more measurements) may be used (e.g., to avoid saturating the receiver). In any case, it may be concluded that for this typical example, there is plenty of time margin available for antenna calibration to be properly performed.

Figure 3:
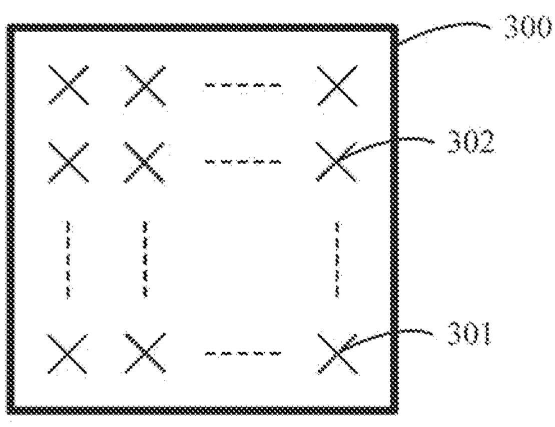
FIG. 3 is a schematic drawing illustrating an example antenna system according to some embodiments.

FIG. 3 schematically illustrates an example antenna system 300 according to some embodiments. The antenna system 300 comprises a plurality of antenna elements 301, 302.

As already mentioned, an antenna calibration measurement may be performed using over-the-air signaling with at least one antenna element of the antenna system configured for transmission and at least one other antenna element of the antenna system configured for reception according to some antenna configuration pattern. For example, a first configuration pattern may comprise antenna element 301 being configured for transmission and some or all other antenna elements being configured for reception, a second configuration pattern may comprise antenna element 302 being configured for transmission and some or all other antenna elements being configured for reception, and so on. Alternatively or additionally, a configuration pattern may comprise two or more antenna elements being configured for transmission and some or all other antenna elements being configured for reception.

Figure 4:
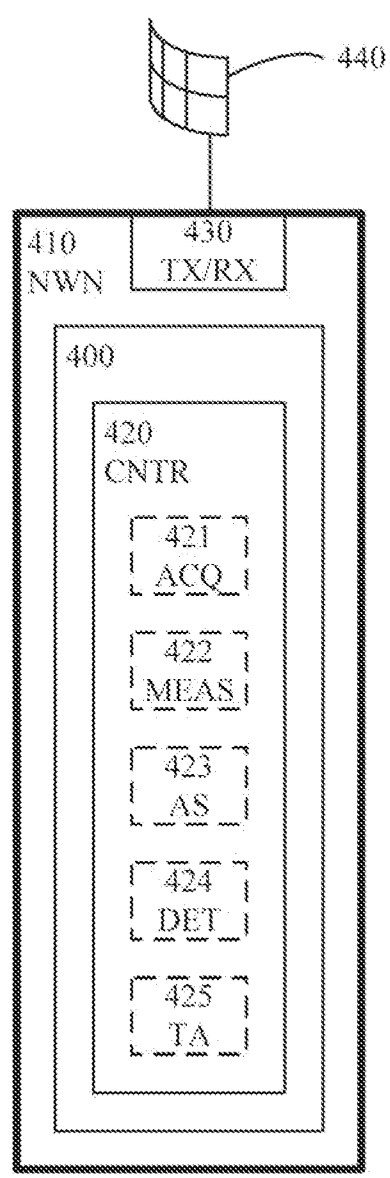
FIG. 4 is a schematic block diagram illustrating an example apparatus according to some embodiments.

FIG. 4 schematically illustrates an example apparatus 400 according to some embodiments. The apparatus 400 may, for example, be comprised in a network node (NWN) 410, such as a radio access node, a base station (BS), an access point (AP), a radio unit (RU), and an open radio access network (O-RAN) radio unit (O-RU).

The apparatus 400 is for controlling antenna calibration of an antenna system 440 that resides in a wireless communication network. For example, the antenna system 440 may be comprised in, or connected/connectable to, the network node 410. The antenna system 440 may be an active/advanced antenna system (AAS).

A transceiver (TX/RX; e.g., transceiving circuitry or a transceiver module) 430 is associated with (e.g., connected, or connectable, to) the antenna system. The transceiver 430 may comprise one or more transceiver chains for transmission and reception via the antenna elements of the antenna system 440 (e.g., one transceiver chain per antenna element).

For example, the transceiver 430 may be comprised in, or connected/connectable to, the network node 410. Alternatively or additionally, the transceiver 430 may be comprised in—or otherwise associated with (e.g., connected, or connectable, to) the apparatus 400.

The antenna calibration is for compensation of impairments associated with operation of the antenna system 440. For example, the apparatus may be configured to cause performance of, e.g., perform, one or more method steps as described in connection with FIG. 1.

The apparatus comprises a controller (CNTR; e.g., controlling circuitry or a control module) 420.

The controller 420 is configured to cause performance of over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols (compare with step 150 of FIG. 1). The measurement may be performed in a corresponding measurement opportunity (compare with 130 of FIG. 1).

To this end, the controller 420 may comprise, or be otherwise associated with (e.g., connected, or connectable, to) a measurer (MEAS; e.g., measuring circuitry or a measurement module) 422. The measurer 422 may be configured to perform over-the-air measurements of the antenna calibration during the unused symbols.

The controller 420 may be further configured to cause switching of one or more antenna elements from transmission mode to reception mode or from reception mode to transmission mode prior to performance of each measurement and during an unused symbol (compare with step 140 of FIG. 1). Alternatively or additionally, the controller 420 may be further configured to cause switching of one or more antenna elements from reception mode to transmission mode or from transmission mode to reception mode after performance of each measurement and during an unused symbol (compare with step 160 of FIG. 1).

To this end, the controller 420 may comprise, or be otherwise associated with (e.g., connected, or connectable, to) an antenna switcher (AS; e.g., antenna switching circuitry or an antenna switch module) 423. The antenna switcher 423 may be configured to switch one or more antenna elements between modes as described above.

The controller 420 may be further configured to cause determination of whether a performed measurement is reliable or unreliable (compare with step 170 of FIG. 1), and, responsive to the performed measurement being unreliable, discarding of a result of the performed measurement (compare with step 175 of FIG. 1) and repetition of the measurement.

To this end, the controller 420 may comprise, or be otherwise associated with (e.g., connected, or connectable, to) a determiner (DET; e.g., determining circuitry or a determination module) 424. The determiner 424 may be configured to determine whether a performed measurement is reliable or unreliable.

As explained above, the measurements may comprise a predetermined set of measurements, wherein different measurements of the set are for different configuration patterns of the antenna elements of the antenna system. The controller 420 may be configured to cause repeated performance of the set of measurements (compare with steps 120, 180, 190 of FIG. 1). For example, the controller 420 may be configured to cause performance of the set of measurements responsive to elapse of a predetermined time since performance of a previous set of measurements, and/or detection of a temperature change in relation to the antenna system, and/or detection of deteriorating communication performance in relation to the antenna system.

In some embodiments, the synchronization symbols are time aligned for two or more network nodes operating within the network. The controller 420 may be configured to cause such time alignment (compare with step 115 of FIG. 1).

To this end, the controller 420 may comprise, or be otherwise associated with (e.g., connected, or connectable, to) a time aligner (TA; e.g., time aligning circuitry or a time alignment module) 425. The time aligner 425 may be configured to time align the synchronization symbols in relation to one or more other network nodes.

The controller 420 may be further configured to cause acquisition of information indicative of the predetermined pattern of unused symbols (compare with step 110 of FIG. 1).

To this end, the controller 420 may comprise, or be otherwise associated with (e.g., connected, or connectable, to) an acquirer (ACQ; e.g., acquiring circuitry or an acquisition module) 421. The acquirer 421 may be configured to acquire the information indicative of the predetermined pattern of unused symbols.

It should be noted that features described in connection with FIG. 1 may be equally applicable-mutatis mutandis—in the context of FIG. 3, even if not explicitly mentioned in connection thereto.

Figure 5:
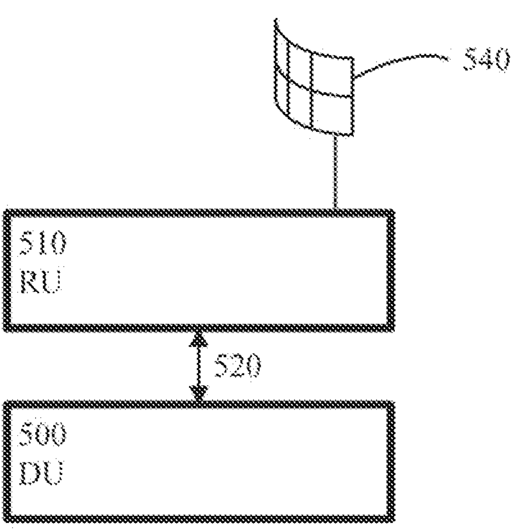
FIG. 5 is a schematic block diagram illustrating an example network node setup according to some embodiments.

FIG. 5 schematically illustrates an example network node setup according to some embodiments. The setup comprises a radio unit (RU; e.g., the network node 410 of FIG. 4) 510 associated with an antenna system 540, and a distributed unit (DU) 500. The RU 510 and the DU 500 are configured to communicate via an interface 520. For example, the RU 510, the DU 500, and the interface 520 may be as specified by open radio access network (O-RAN) specifications (e.g., according to the O-RAN FH functional split 7.2x).

Figure 6:
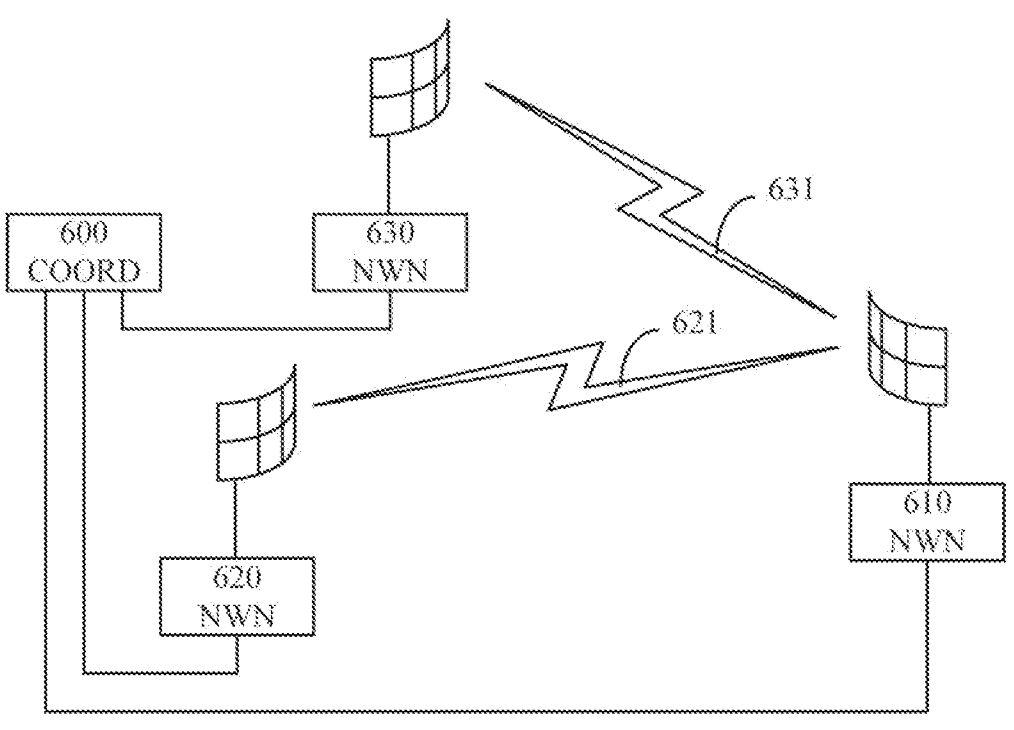
FIG. 6 is a schematic drawing illustrating network nodes of a wireless communication system according to some embodiments.

FIG. 6 schematically illustrates three network nodes 610, 620, 630 of a wireless communication system according to some embodiments. For example, at least one of the network nodes 610, 620, 630 may correspond to the network node 410 of FIG. 4 and/or the RU 510 of FIG. 5; configured perform over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols.

The synchronization symbols—and thereby at least some of the unused symbols—are time aligned for the network nodes 610, 620, 630. As mentioned above, this has the benefit that, when the network node 610 performs over-the-air measurements for antenna calibration, interference 621, 631 caused by transmissions by the other network nodes 620, 630 is reduced or completely absent.

The synchronization symbol time alignment for the network nodes 610, 620, 630 may be accomplished via a coordination node (COORD) 600, for example.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node (e.g., a radio access node).

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 7:
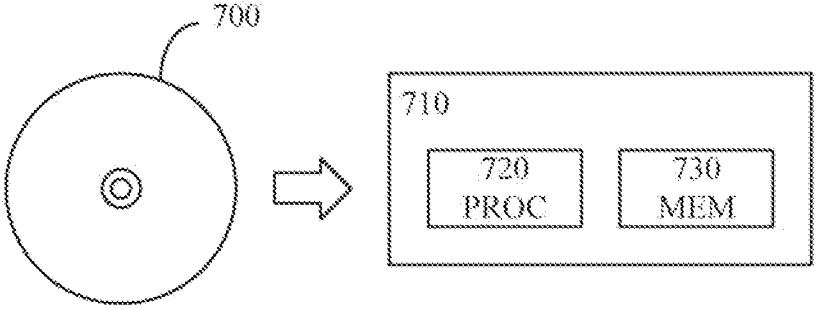
FIG. 7 is a schematic drawing illustrating an example computer readable medium according to some embodiments.

According to some embodiments, a computer program product comprises a non-transitory computer readable medium such as, for example, a universal serial bus (USB) memory, a plug-in card, an embedded drive, or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., a data processing unit) 720, which may, for example, be comprised in a network node 710. When loaded into the data processor, the computer program may be stored in a memory (MEM) 730 associated with, or comprised in, the data processor. According to some embodiments, the computer program may, when loaded into, and run by, the data processor, cause execution of method steps according to, for example, the method illustrated in FIG. 1, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for controlling antenna calibration of an antenna system residing in a wireless communication network, wherein the antenna calibration is for compensation of impairments associated with operation of the antenna system, the method comprising:

performing over-the-air measurements of the antenna calibration during unused symbols defined by a predetermined pattern of unused symbols, wherein the predetermined pattern of unused symbols comprises unused symbols directly preceding synchronization symbols and/or unused symbols directly following synchronization symbols.

2. The method of claim 1, wherein the predetermined pattern comprises sequences of consecutive unused symbols, wherein each sequence of consecutive unused symbols comprises one or more measurement opportunities, and wherein each measurement is performed during a respective measurement opportunity.

3. The method of claim 1, wherein the unused symbols are symbols that are unassigned and/or undedicated and/or unallocated.

4. The method of claim 1, wherein the synchronization symbols are time aligned for two or more network nodes operating within the network.

5. The method of claim 4, wherein the unused symbols are symbols of slots comprising the one or more SSBs, and wherein each SSB consists of four symbols, and/or each of the slots comprises up to two SSBs, and/or each of the slots consists of fourteen symbols, and/or a predetermined pattern is configured to comprise between twelve and sixty-four SSBs, and/or each of the slots comprises three, four, five, or six unused symbols.

6. The method of claim 1, further comprising, for each of the measurements:

prior to performing the measurement and during an unused symbol, switching one or more antenna elements from transmission mode to reception mode or from reception mode to transmission mode; and/or after performing the measurement and during an unused symbol, switching one or more antenna elements from reception mode to transmission mode or from transmission mode to reception mode.

7. The method of claim 1, wherein the measurements are performed using over-the-air signaling with at least one antenna element of the antenna system configured for transmission and at least one other antenna element of the antenna system configured for reception.

8. The method of claim 7, wherein performing the measurements comprises performing the set of measurements responsive to one or more of:

elapse of a predetermined time since performance of a previous set of measurements;

detection of a temperature change in relation to the antenna system; and detection of deteriorating communication performance in relation to the antenna system.

9. The method of claim 1, further comprising, for at least one of the measurements:

determining whether the performed measurement is unreliable; and when the performed measurement is unreliable, discarding a result of the performed measurement and repeating the measurement.

10. The method of claim 1, wherein the synchronization symbols are symbols of one or more synchronization signal blocks, SSBs.

11. The method of claim 1, further comprising dynamically controlling relative phrase and gain relations between antennas of the antenna system.

12. An apparatus for controlling antenna calibration of an antenna system residing in a wireless communication network, wherein the antenna calibration is for compensation of impairments associated with operation of the antenna system, the apparatus comprising controlling circuitry configured to cause the apparatus to:

perform over-the-air measurements of the antenna calibration during unused symbols directly preceding synchronization symbols and/or unused symbols directly following synchronization symbols.

13. A network node comprising:

an antenna system; and an apparatus for controlling antenna calibration of the antenna system in a wireless communication network, wherein the antenna calibration is for compensation of impairments associated with operation of the antenna system, the apparatus comprising controlling circuitry configured to cause the apparatus to perform over-the-air measurements of the antenna calibration during unused symbols directly preceding synchronization symbols and/or unused symbols directly following synchronization symbols.

14. The network node of claim 13, wherein the network node is one or more of: a radio access node, a base station, an access point, a radio unit, an open radio access network radio unit.

15. The network node of claim 13, wherein the antenna system is an active antenna system, AAS.

* * * * *